US009159137B2

(12) United States Patent
Huang et al.

(10) Patent No.: US 9,159,137 B2
(45) Date of Patent: Oct. 13, 2015

(54) PROBABILISTIC NEURAL NETWORK BASED MOVING OBJECT DETECTION METHOD AND AN APPARATUS USING THE SAME

(71) Applicant: National Taipei University of Technology, Taipei (TW)

(72) Inventors: Shih-Chia Huang, Taipei (TW); Bo-Hao Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 99 days.

(21) Appl. No.: 14/052,782

(22) Filed: Oct. 14, 2013

(65) Prior Publication Data

US 2015/0104062 A1   Apr. 16, 2015

(51) Int. Cl.
 *G06K 9/00*   (2006.01)
 *G06T 7/00*   (2006.01)
(52) U.S. Cl.
 CPC ............. *G06T 7/0081* (2013.01); *G06T 7/0087* (2013.01); *G06T 2207/10016* (2013.01); *G06T 2207/20076* (2013.01); *G06T 2207/20084* (2013.01); *G06T 2207/20144* (2013.01); *G06T 2207/30236* (2013.01)
(58) Field of Classification Search
 None
 See application file for complete search history.

(56) References Cited

U.S. PATENT DOCUMENTS

| 6,211,971 | B1* | 4/2001 | Specht | 358/1.9 |
| 8,041,115 | B2* | 10/2011 | Liu et al. | 382/173 |
| 8,855,436 | B2* | 10/2014 | Bulan et al. | 382/236 |
| 2007/0058837 | A1* | 3/2007 | Boregowda et al. | 382/103 |
| 2007/0206865 | A1* | 9/2007 | Boregowda et al. | 382/225 |
| 2008/0025568 | A1* | 1/2008 | Han et al. | 382/103 |
| 2009/0041359 | A1* | 2/2009 | Park | 382/199 |
| 2009/0110299 | A1* | 4/2009 | Panahpour Tehrani et al. | 382/224 |
| 2009/0196464 | A1* | 8/2009 | Dimitrova et al. | 382/118 |
| 2009/0304230 | A1* | 12/2009 | Krahnstoever et al. | 382/103 |
| 2010/0142809 | A1* | 6/2010 | Won et al. | 382/165 |

OTHER PUBLICATIONS

Zhiming, Wang, Zhang Li, and Bao Hong. "Pnn based motion detection with adaptive learning rate." Computational Intelligence and Security, 2009. CIS'09. International Conference on. vol. 1. IEEE, 2009.*
Bin Samma, A. S., Rosalina Abdul Salam, and Abdullah Zawawi Talib. "Enhancement of background subtraction approach for image segmentation."Information Sciences Signal Processing and their Applications (ISSPA), 2010 10th International Conference on. IEEE, 2010.*
Specht, Donald F. "Probabilistic neural networks." Neural networks 3.1 (1990): 109-118.*

(Continued)

*Primary Examiner* — Bhavesh Mehta
*Assistant Examiner* — Narek Zohrabyan
(74) *Attorney, Agent, or Firm* — Jianq Chyun IP Office

(57) ABSTRACT

The present disclosure proposes a method of moving object detection in variable bit-rate video steams based on probabilistic neural networks, and the method features a background generation module and a moving object detection module. The background generation module produces a model of background images which express properties of variable bit-rate video streams. The moving object detection module distinguishes a moving object in both low and high bit-rate video steams in an efficient manner. The detection result is generated by calculating the output value of the probabilistic neural networks.

18 Claims, 7 Drawing Sheets

(56) References Cited

OTHER PUBLICATIONS

Haifeng, Sang, and Xu Chao. "Moving object detection based on background subtraction of block updates." Intelligent Networks and Intelligent Systems (ICINIS), 2013 6th International Conference on. IEEE, 2013.*

Culibrk, Dubravko, et al. "Neural network approach to background modeling for video object segmentation." Neural Networks, IEEE Transactions on 18.6 (2007): 1614-1627.*

Wu, Jiapeng, et al. "Virtual line group based video vehicle detection algorithm utilizing both luminance and chrominance." Industrial Electronics and Applications, 2007. ICIEA 2007. 2nd IEEE Conference on. IEEE, 2007.*

Chen, Bo-Hao, and Shih-Chia Huang. "A novel moving vehicles extraction algorithm over wireless internet." Systems, Man, and Cybernetics (SMC), 2012 IEEE International Conference on. IEEE, 2012.*

Zhou et al., "Modified GMM Background Modeling and Optical Flow for Detection of Moving Objects," IEEE International Conference on Systems, Man and Cybernetics 3, Oct. 10-12, 2005, pp. 2224-2229.

Manzanera et al., "A new motion detection algorith based on signa delta background estimation," Elsevier Science, Aug. 21, 2007, pp. 1-12.

Ha et al., "Foreground objects detection using multiple difference images," Optical Engineering 49 (4), Apr. 2010, pp. 047201-1-5.

Manzanera et al., "A robust and computationally efficient motion detection algorithm based on sigma delta background estimation.," Indian Conference on Computer Vision, Graphics and Image Processing (ICVGIP'04), Dec. 16-18, 2004, pp. 46-51.

Oral et al., "Centre of mass model—A novel approach to background modelling for segmentation of moving objects," Image and Vision Computing 25, Jan. 1, 2007, pp. 1365-1376.

* cited by examiner

| ε | Δ | γ | ω | α |
|---|---|---|---|---|
| 50 | 10 | 14 | 0.7 | 0.3 |

FIG. 7

PROBABILISTIC NEURAL NETWORK BASED MOVING OBJECT DETECTION METHOD AND AN APPARATUS USING THE SAME

TECHNICAL FIELD

The present disclosure is directed to a moving object detection method based on a probabilistic neural network (PNN) model and an apparatus using the same method.

RELATED ART

During recent years, image detection systems have been proposed in various applications in order to identify moving objects. In particular, wireless video surveillance has been a key technology in the management of intelligent surveillance system which uses automatic detection to track a moving object. Within the field of traffic management for example, image detection techniques have deployed in intelligent transportation system for the purpose of optimizing the traffic flow. By accurately distinguishing vehicles in the midst of background objects, an intelligent transportation system may more accurately know the current traffic volume along a road or a highway or to even detect and track a particular vehicle.

There are at least three conventional approaches by which moving vehicles could be detected: optical flow, temporal difference, and background subtraction.

The optical flow technique would be based on the projected motion on the image plane. Unfortunately, the optical flow technique could be both very sensitive to noise and very inefficient for traffic applications and thus would not be considered for the present disclosure.

A temporal differencing technique has been used to calculate the difference between consecutive frame in order to adjust for environmental changes when detecting moving vehicles. However, this method incompletely extracts the shapes of moving vehicles, a problem which is especially prevalent when vehicles are motionless or exhibit limited mobility. There present disclosure would have no resemblance with the temporal differencing technique.

Background subtraction has been a particularly popular method for detecting moving vehicles in video sequences. The background subtraction technique accomplishes background pixel detection by comparing the pixel feature differences between the current image and a reference background model of the previous image. The technique of background subtraction at this point in time has been the most satisfactory method for solving problems related to moving objects in an image.

Many variations of the background subtraction method have been proposed and used in previous studies to detect moving vehicles within video sequences in an ideal bandwidth network environments. An $\Sigma$-$\Delta$ filter technique has been used in the Sigma Difference Estimation (SDE) approach so as to estimate two orders of temporal statistics for each pixel of the sequence in accordance with a pixel-based decision framework. Unfortunately, using a single $\Sigma$-$\Delta$ filter for each incoming pixel may be insufficient for complete object detection when the SDE approach operates in certain complex environments. The Multiple SDE (MSDE) approach which combines multiple $\Sigma$-$\Delta$ estimators to calculate a hybrid background model was developed in order to solve the problem. In addition to the $\Sigma$-$\Delta$ filter technique, each pixel value is modeled independently in one particular distribution by using the Gaussian Mixtures Models (GMM) approach. The subsequent distribution of each pixel is determined based on whether or not it belongs to the background. In contrast, a background model derived by the Simple Statistical Difference (SSD) uses the temporal average as the main criteria to accomplish the detection of moving vehicles. The Multiple Temporal Difference (MTD) approach retains several previous reference images with which to calculate the differences between each frame. This, in turn, shrinks gaps within the moving objects.

However, video communication from these traffic cameras over real-world networks with limited bandwidth may frequently suffer network congestions or bandwidth instabilities. This is especially true when transmitting video information over wireless video communication systems. To allocate the available amount of network bandwidth and produce variable bit-rate video streams, a rate control scheme would be used with the assistance of using H.264/AVC as an effective video-coding tool. Suitable bit-rate video streams could thus be produced for transmission over a network with limited and fluctuating bandwidths. However, none of the aforementioned technique could adequately detect moving objects from images with constantly fluctuating qualities. When data traffic congestions occur in a communication network, most user could tolerate a streaming video having reduced quality rather than a video which lags or stands still. Therefore, a rate control scheme has been introduced as an effective video-coding tool for controlling the bit rate of video streams. Using this technique, variation bit-rate video streams could be produced which allows robust transmission in wireless communication systems.

Unfortunately, although the rate-control scheme may increase the efficiency of video stream transmission over networks with limited bandwidth, its tendency to continuously change the bit rate decreases the ease of detecting moving objects. Because of this, the aforementioned state-of-the-art background subtraction methods in variable bit rate video streams generally cannot produce satisfactory detection results.

For example, FIGS. 1(a) and 1(b) shows a same streaming video captured by a camera and transmitted over a wireless network. FIG. 1(a) is frame number 570 which has a bit rate 1,000,000 pixels per second, and FIG. 1(b) is frame number 685 which has a bit rate of 20,000 pixels per second. FIG. 1(a) illustrates a pixel 101 of a freeway asphalt pavement, FIG. 1(b) illustrates the same pixel 102 of the subsequent frame of the freeway asphalt pavement. FIG. 1(c) compares data of the same pixel from which its intensity variations in luminance (Y) component over the frame index were gathered. Under the scenario of FIG. 1(a), FIG. 1(b), and FIG. 1(c) after the image bit rate has switched from a high quality signal to a low quality signal, the pixel value fluctuation would often disappear and a pixel value indicating a moving object 103 such as a moving vehicle would often be misinterpreted as a background object by using a conventional background subtraction technique.

For another scenario, FIG. 2(a) shows a frame number 1660 of a same video stream, and frame number 1660 has a bit rate of 30,000 pixels per second. FIG. 2(b) shows a frame number 1830 of a same video stream, and the frame number 1830 has a bit rate of 2,000,000 pixels per second. A background pixel 103 is sampled from the frame of FIG. 2(a), and the background pixel 104 is sampled from the frame of FIG. 2(b). FIG. 1(c) compares data of the same pixel from which its intensity variations in luminance (Y) component over the frame index were gathered. Under the scenario of FIG. 2(a), FIG. 2(b), and FIG. 2(c), when the network bandwidth is sufficient, the rate control scheme would typically increase a low bit-rate video stream to high bit-rate video stream in order to match free network bandwidth, the background the fluctuations 105 of pixel value under a conventional background subtraction would often result in a false positive as the background pixel would often been misinterpreted as a moving object.

In response to the aforementioned problem of misidentification resulted from transmitting captured imaged of fluctuating qualities, a new type of moving vehicle detection method could be proposed in order to enhance the accuracy of image detection under the circumstance of having variation bit-rate video streams.

SUMMARY OF THE DISCLOSURE

Accordingly, the present disclosure proposes a moving object detection method based on a probabilistic neural network (PNN) model through artificial neural networks and an apparatus using the same, and the present disclosure is suitable for transmitting video images over fluctuating bandwidth limiting networks.

The proposed method is aimed to discern whether a pixel in a video image would be categorized as a background image pixel or a moving object pixel for the purpose of detecting moving objects in a stream of video sequences in which video frames could contain a mixture of high bit rate frames and low bit rate frames. The method could be summarized as follows. A background model would be generated based on the PNN model which contains four layers including an input layer, a pattern layer, a summation layer, and an output layer. Each layer would be composed of a plurality of neurons with each neuron associating with a particular number as weight which could be established by first analyzing pixel distributions of the time series of each incoming pixel at every frame of the stream of video sequences during a training process. The pixel distributions would then be relayed to the pattern layer neurons of PNN, whereupon the neurons would be differentiated into categories for the construction of the summation layer in the PNN structure.

Next, after having a background image model in place, for each incoming frame of the video sequence, the frame would be divided into a plurality of blocks. A block estimation procedure would be used to statistically eliminate blocks which would be highly likely to contain only background images or highly unlikely to contain any images of moving objects. From the remaining blocks, each pixel would be determined as for whether the pixel is a background image pixel or a moving image pixel by utilizing the established background image model. The background image model would then be updated so that subsequent detections could be more accurate under the environment of variable bit-rates.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a table which illustrates specific parameter values of PNNMD in accordance with one of the exemplary embodiments of the present disclosure.

DETAILED DESCRIPTION OF DISCLOSED EMBODIMENTS

Figure 1:
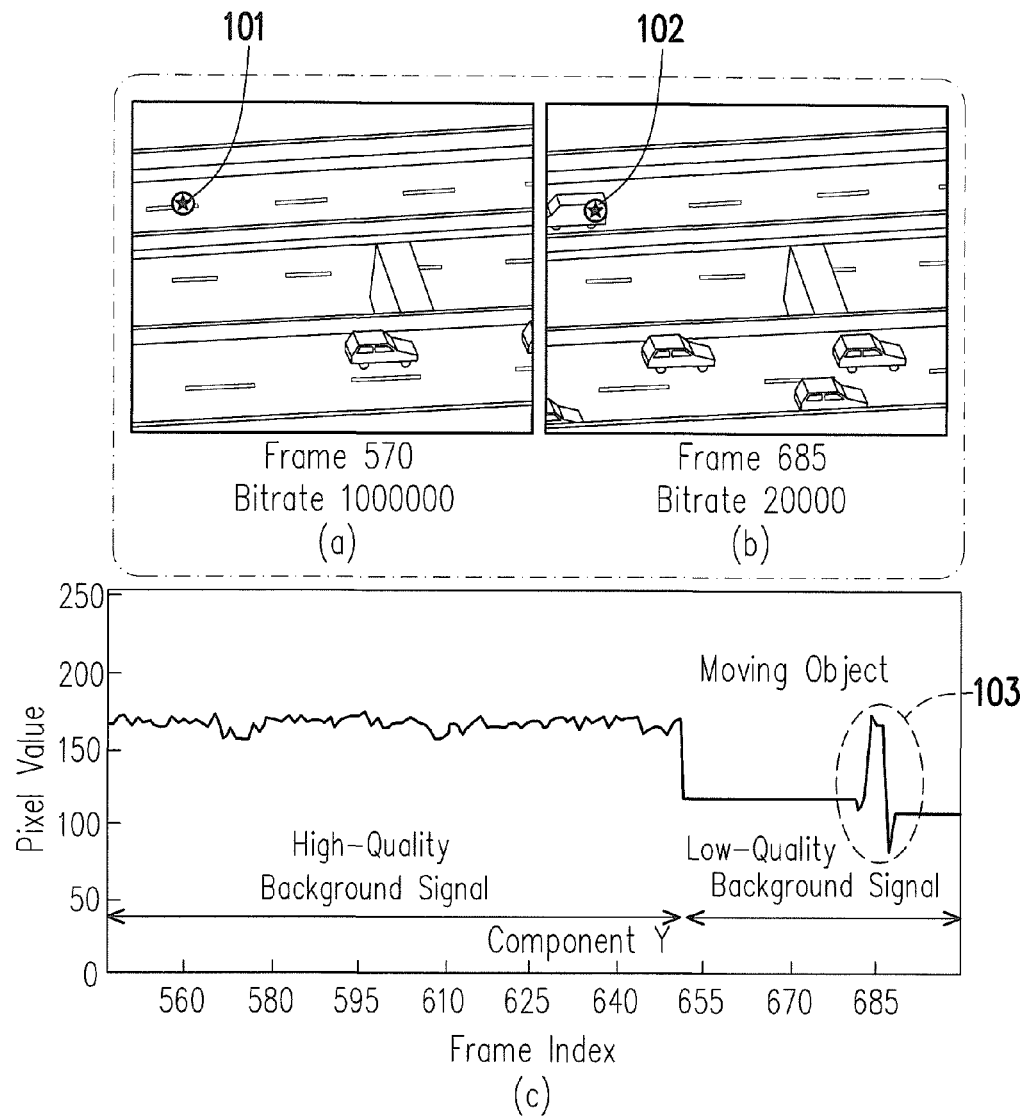
FIGS. 1(a)~1(c) illustrate an exemplary scenario in which intensity variations of a same pixel has shifted from having a low bit-rate to a high bit-rate in a video stream.
Figure 2:
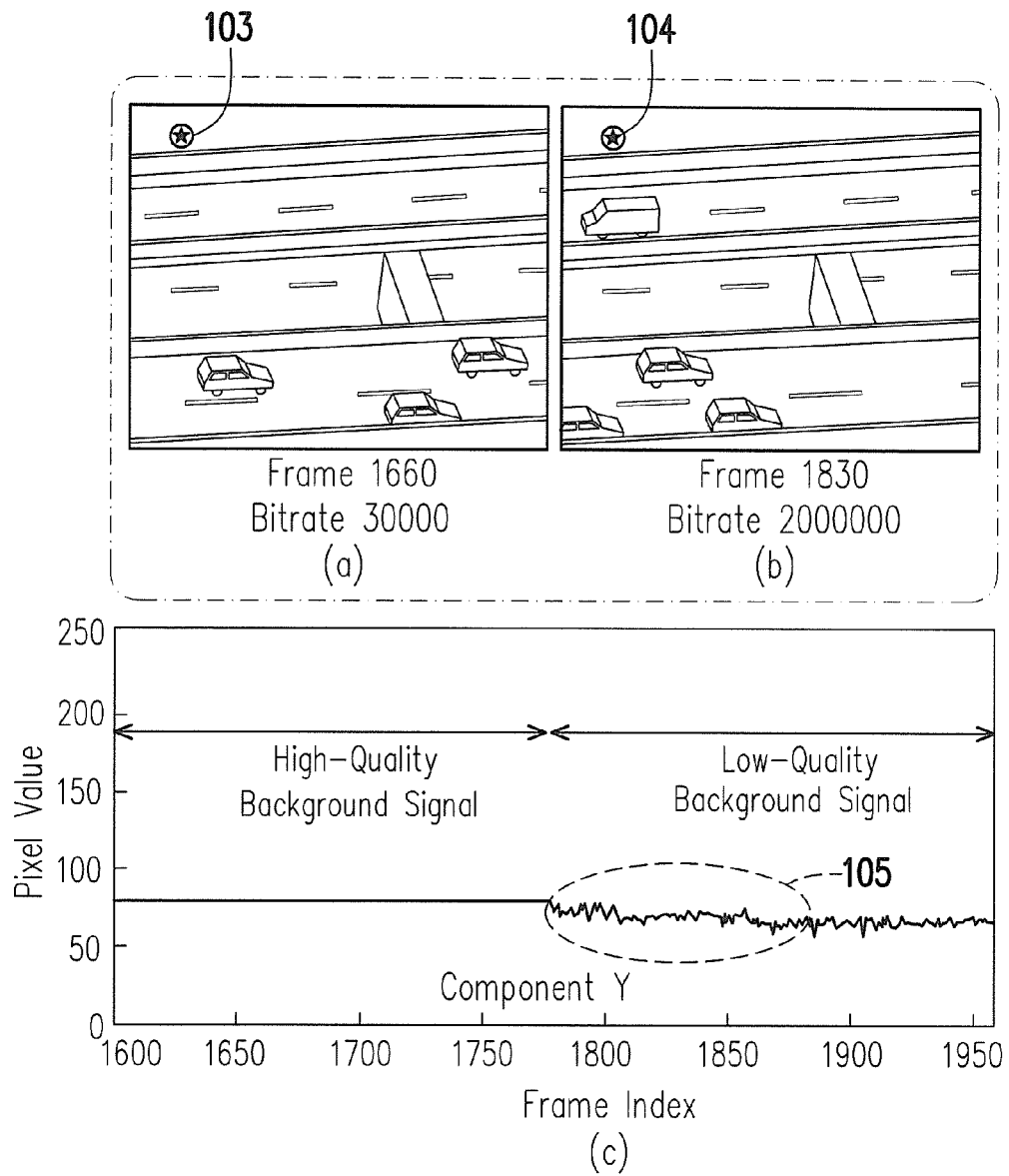
FIGS. 2(a)~2(c) illustrate an exemplary scenario in which intensity variations of a same pixel has shifted from having a high bit-rate to a low bit-rate in a video stream.

Reference will now be made in detail to the present preferred embodiments of the disclosure, examples of which are illustrated in the accompanying drawings. Wherever possible, the same reference numbers are used in the drawings and the description to refer to the same or like parts.

Figure 3:
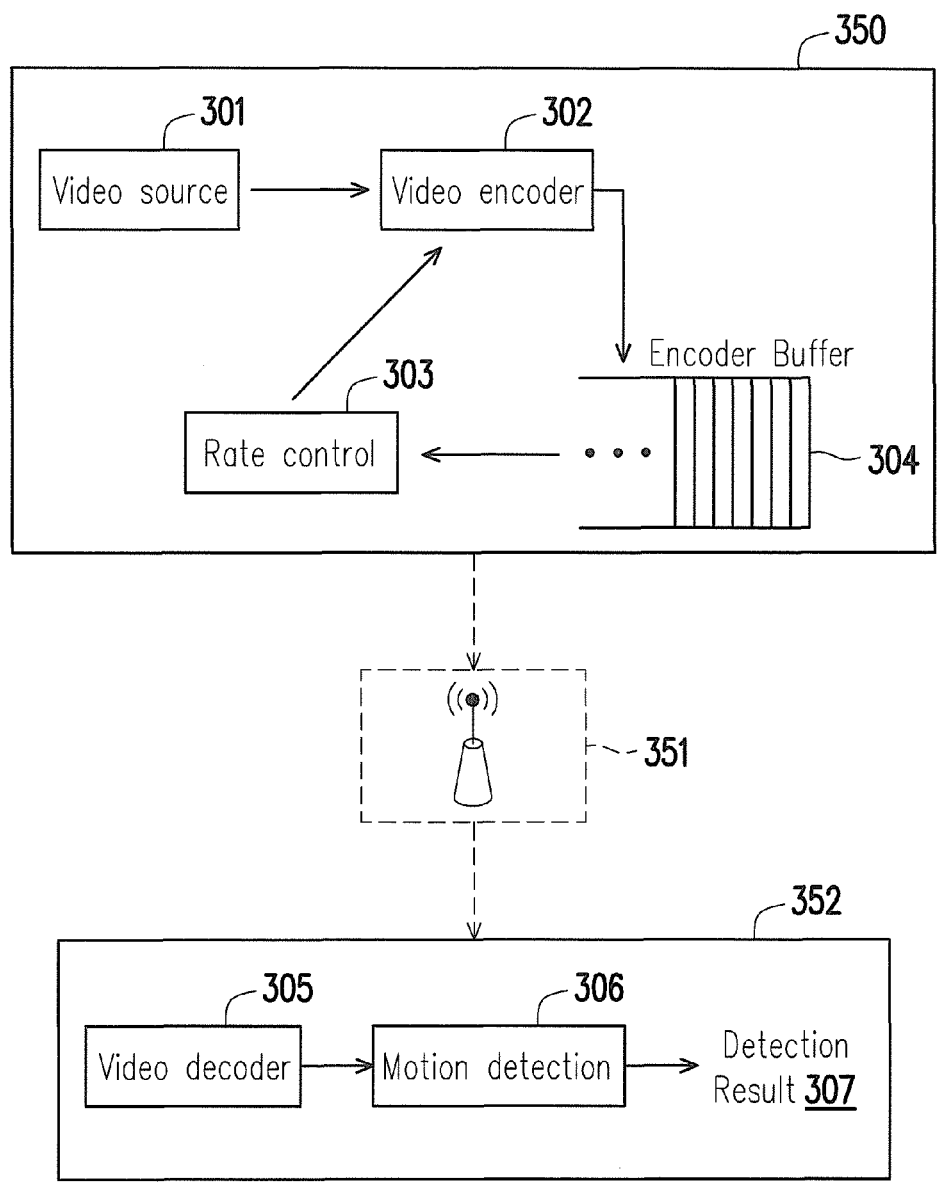
FIG. 3 illustrates an exemplary system architecture which utilizes the proposed method from the hardware perspective in accordance with one of the exemplary embodiments of the present disclosure.

FIG. 3 illustrates an exemplary system architecture which utilizes the proposed method from the hardware perspective in accordance with one of the exemplary embodiments of the present disclosure. A typical system for object detection could be deployed in a traffic management system to detect traffic volume or a particular vehicle or could be deployed in an airport or shopping center for security reasons. The exemplary system of FIG. 3 may include a recording platform 350 and an analysis platform 352. The recording platform 350 may include a video source 301 which is an apparatus for capturing videos such as one or more surveillance cameras. The video source 301 would output captured raw footage to a video encoder 302 which would typically be controlled by a rate control module 303. The video encoder 302 would output encoded video to an encoder buffer 304 which would interact with the rate control module 303 to control the video encoder 302. The recording platform would then output encoded videos to a network 351 by going through a wireless connection or a cable connection. The network 351 could be a 3G or LTE network connected to a core network, or the network could be an intranet or a private network. The encoded videos would then be received by the analysis platform 352. The analysis platform would include a video decoder 305 which decodes received encoded videos, and the decoded videos would then be transferred to a motion detection module 306 which would then output analyzed detection result 307.

It should be mentioned that the motion detection 306 would typically be performed as a part of the video encoder 302 within the recording platform; however the present disclosure would favor the motion detection 306 being implemented after the video decoder 305. The advantage of doing so is that the motion detection 306 could be performed for video of any specifications as opposed to videos having to adhere to a particular type of specification. The analysis platform 352 could be an electronic device having a processor, a storage medium, and transceiver. The transceiver would receive encoded video received from the network 351, the storage medium would provide a temporary or permanent storage mean for the analysis platform 352, and the processor would be used to perform the moving object detection method as proposed.

Figure 4:
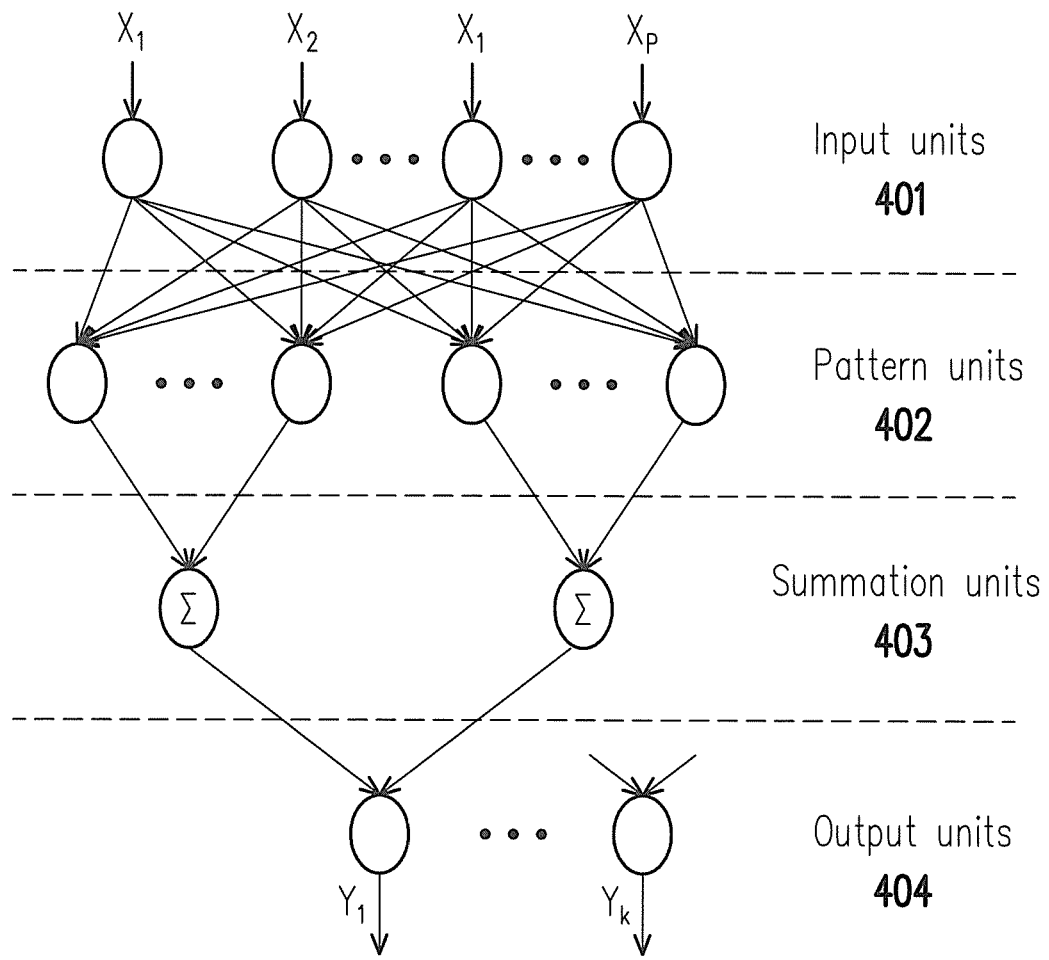
FIG. 4 illustrates a four layer PNN architecture in accordance with one of the exemplary embodiments of the present disclosure.
Figure 5:
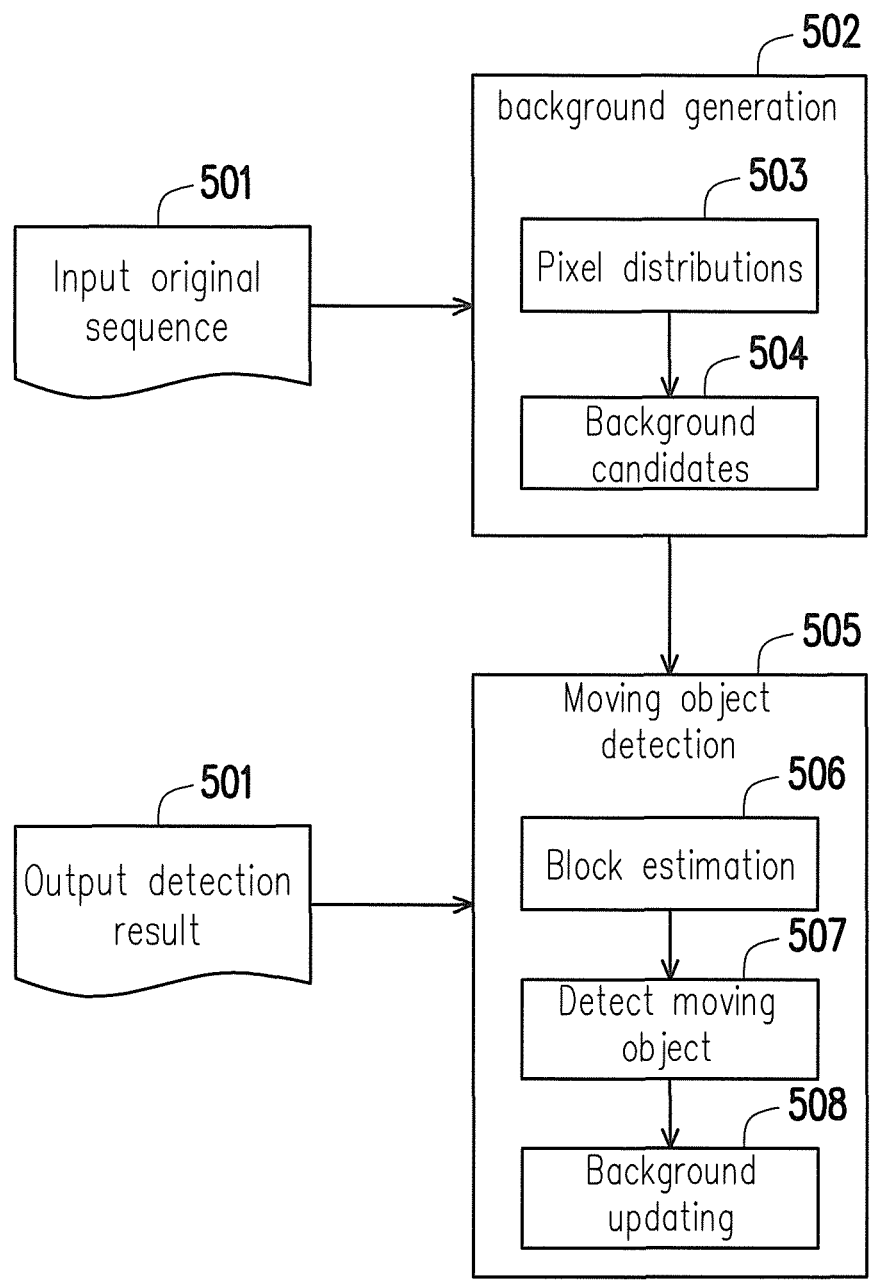
FIG. 5 illustrates the proposed PNN-based motion detection (PNNMD) in terms of functional block diagrams in accordance with one of the exemplary embodiments of the present disclosure.

The present disclosure proposes an approach of using PNN through artificial neural networks to detect moving vehicles in response to receiving low and high bit-rate video streams. The architecture of PNN would include an input units layer 401, a pattern units layer 402, a summation units layer 403, and an output units layer 404 as illustrated by FIG. 4. Each neuron or node of the layers 401~404 contain typically a real number. The new way of calculation of these numbers would be presented later on. The motion detection module 306 may have at least two parts, a background generation module 502 and a moving vehicle detection module 505 which is shown in FIG. 5. The architecture of PNN would be used in both the background generation module 502 and the moving vehicle detection module 505.

FIG. 5 illustrates the modules involved in the proposed PNN-based motion detection (PNNMD) method in terms of functional block diagrams. An input of an original video frames sequence (i.e. decoded video sequence obtained from the video decoder 305) would be received by the background generation module 502 which generates a module of the background pixels. For any particular spot where images are continuously being captured, the background could be assumed to be fixed. The background generation module would have at least a first sub-module 503 which calculates the pixel distributions from the original sequences 501, and a second sub-module 504 which determines the background candidates 504 of the original sequence 501. More specific details related to the background generation module 502 would be presented later on. Essentially, to accommodate the properties of video streams with different bit rates, the proposed background generation module 502 would activate the neurons of the pattern units layer 402 and the summation units layer 403 by analyzing the pixel distributions from the time series of each incoming pixel at every frame received by the input units layer 401. This pixel distributions information will then be relayed to the pattern units 402 layer neurons of PNN, whereupon the neurons will be differentiated into categories for the construction of the summation units layer 403 in the PNN structure.

Next, the proposed moving vehicle detection module 505 would be implemented to accurately detect moving vehicles in either low or high bit-rate video streams. The generated background model of the background generation module 502 would be outputted to the moving vehicle detection module 505 which would have at least a third sub-module 506 which does block estimation to determine blocks most likely have only background pixels. Block which most likely would have only background pixels would be eliminated from the subsequent moving object detection process. The fourth sub-module 507 would calculate each value of block statistics to eliminate the unnecessary blocks that are regarded as having a high probability of containing only the background area. This would allow the subsequent vehicle detection procedure to detect moving vehicles from only those blocks that are regarded as having a high probability of containing moving vehicles. After blocks most likely to have only background pixels have been filtered out, the output from the third sub-module 506 will be delivered to the fourth sub-module 507 which detects for pixels which are supposed to have moving objects. After the task has been completed by the fourth sub-module 507, the fifth sub-module 508 performs background updating to update the background model generated for this particular sequence of motion images by a background updating procedure to be proposed later on so that the moving vehicle detection module 505 can accurately fulfill the extraction of moving vehicles in variable bit-rate video streams for subsequent frames.

Figure 6:
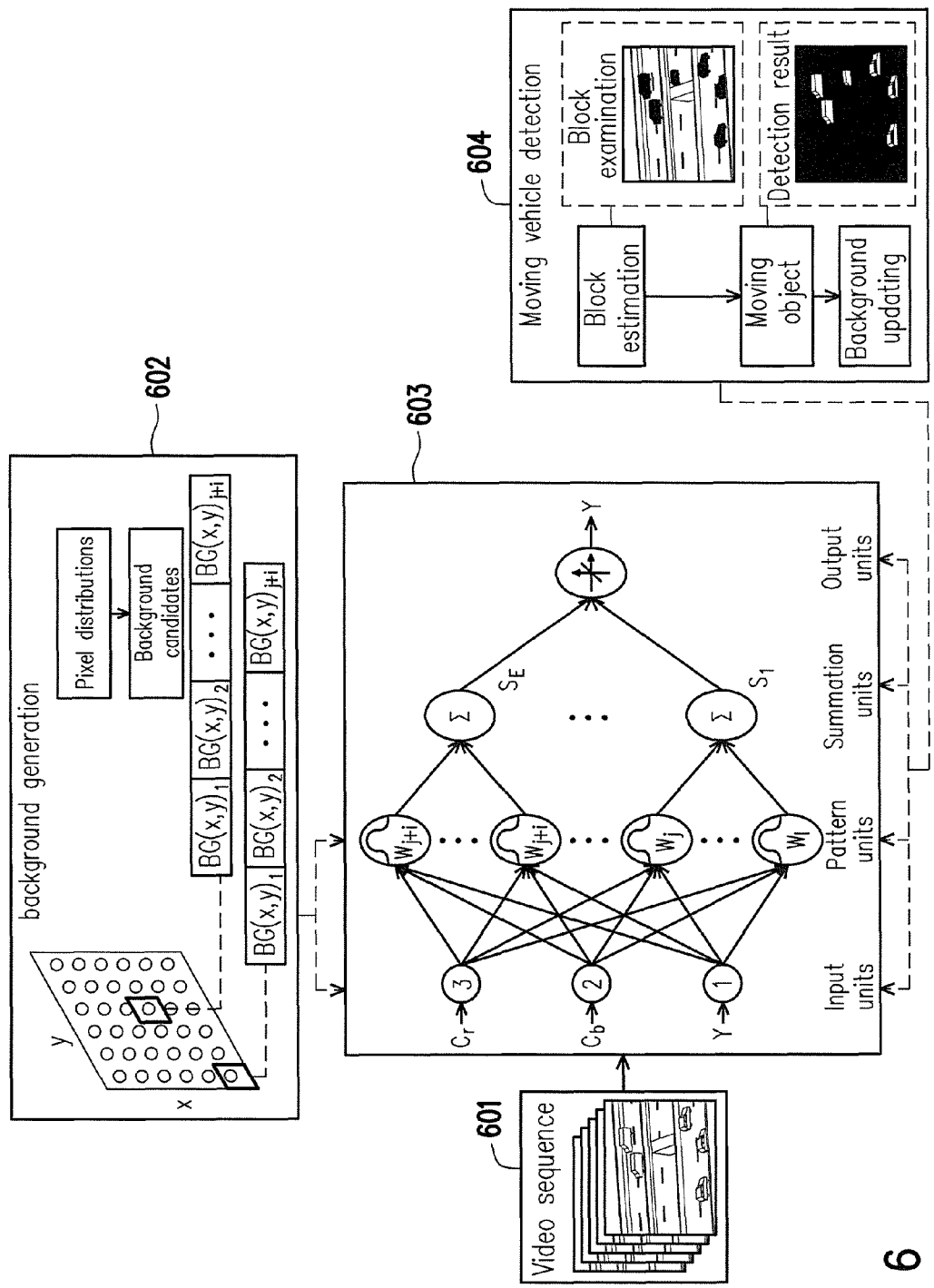
FIG. 6 is a flow chart of the proposed PNNMD approach in accordance with one of the exemplary embodiments of the present disclosure.

FIG. 6 is a detailed diagram of the proposed PNNMD approach in accordance with one of the exemplary embodiments of the present disclosure, and please refer to FIGS. 4-6 together. The proposed PNNMD approach would take in a video sequence 601 and generate a background model 602. The background model would then define the PNN structure 603 by establishing the relationships between the input units layer and the pattern units layer in order to determine the number of neurons of the pattern units layer as well as the coefficients of each neuron of the pattern units layer. The PNN structure would then be used by the moving object detection module 604 to determine on a pixel by pixel basis whether a pixel is a moving object pixel or a background pixel.

In an attempt to support extensive video applications, the input layer of PNN is built in the $Y C_b C_r$ color space by three perceptual variables: luminance (Y), blue-difference chroma ($C_b$), and red-difference chroma ($C_r$). This would be to support all different specifications of motion images. The color component of a pixel $p_t(x, y)$ can be presented as $(Y, C_b, C_r)$ via luminance, blue-difference chroma, and red-difference chroma values, respectively, in each incoming video frame $I_t$ as the inputs to the neurons or nodes of input units layer (e.g. 401). The x and y of the pixel $p_t(x, y)$ refers to the coordinate of a particular pixel, and t refers to a particular incoming frame. Accommodation of bit-rate fluctuations in video streams requires construction of a precise background model. This is accomplished by PNN through the activation of the pattern layer neurons (e.g. 402) at each incoming t-th frame. Each incoming pixel intensity $p_t(x, y)$ would be digitized into L levels that are $\{p_t(x; y)_0, p_t(x; y)_1, \ldots, p_t(x; y)_{L-1}\}$. (The L level here refers to gray scale levels would thus contain values such as 0~255) The number of times that each level appears in the incoming t-th frame is calculated by comparing the histograms of the pixel distributions to generate the pattern-layer neurons of PNN. The pixel distributions can be determined as follows:

$$D(p_t)(x,y)_k = \{n_0, n_1, \ldots, n_k, \ldots, n_{L-1}\} \quad (1)$$

where $n_k$ is the number of pixels whose level is $p_t(x; y)_k$. After the pixel distributions are generated, the pattern-layer neurons $C_t(x; y)_i$ are activated on the basis of the applied suitable threshold value $\epsilon$, which can be expressed as follows:

$$P_t(x, y)_k \begin{cases} \in C_t(x, y)_i, & \text{if } D(p_t(x, y)_k) \geq \varepsilon \\ \notin C_t(x, y)_i, & \text{if } D(p_t(x, y)_k) < \varepsilon \end{cases} \quad (2)$$

where k=0 to L−1.

Equation (2) in plain language means that when the distribution of a particular incoming t-th frame exceeds a threshold $\epsilon$, then the pixel intensity $p_t(x, y)$ would be set to equal to $C_t(x, y)_i$ which would then be used as the weight or $W_i$ of a neuron or node of a pattern unit.

Next, we would define a comparison that returns the identity category for the given input neurons of the pattern layer in order to determine whether the neurons of the pattern layer belong to the neuron of the summation layer. This is accomplished by comparing the similarity between the neurons $C_t(x; y)_i$ and $C_t(x; y)_{i+1}$, and then assigning $C_t(x; y)_i$ to either class $U(x; y)_m$ or class $U(x; y)_{m+1}$. This can be expressed as follows:

$$U(x, y)_m = \begin{cases} \in C_t(x, y)_i, & \text{if } |C_t(x, y)_i - C_t(x, y)_i + 1| \le \Delta \\ \notin C_t(x, y)_i, & \text{if } |C_t(x, y)_i - C_t(x, y)_i + 1| > \Delta \end{cases} \quad (3)$$

where $\Delta$ is an empirical threshold.

Equation (3) in plain language compares the weight value of a particular neuron with the weight value of an adjacent neuron. When the weight values are determined to be dissimilar and the dissimilarity would exceed a certain threshold, then a new neuron would be created between the two adjacent neurons which were compared. Also it should be noted that establishing the PNN structure may require some training initially.

After the Y $C_b$ $C_r$ components (Y, $C_b$, $C_r$) of the incoming pixel $p_t(x; y)$ have been delivered to the pattern-layer neurons $W(x, y)_1$ to $W(x, y)_i$, to estimate the similarity between the current incoming pixel $p_t(x; y)$ and the i-th pattern-layer neuron $W_i$, a block estimation procedure which combines the Euclidean distance with the Gaussian activation function would be used. The difference between the current incoming pixel $p_t(x; y)$ and the i-th pattern-layer neuron $W_i$ could be expressed as follows:

$$Z(p_t, W_i)m = \exp\left(\frac{-\|p_t(x; y) - W_i\|^2}{2\sigma^2}\right) \quad (4)$$

where $\sigma$ is the empirical tolerance, m=1 to E, and E represents the number of summation-layer neurons. After the Gaussian activation function is calculated, the summation-layer neurons sum the Gaussian activation function in each category as follows:

$$S(m) = \Sigma_{i=1}^H Z(p_t, W_i)_m \quad (5)$$

where H is the number of pattern-layer neurons in the m-th summation-layer neuron. Then, the maximum value of the sum is chosen to determine whether the block has a high probability of containing background information. This can be expressed as follows:

$$S_{max} = \max_{m=1-E} S(m) \quad (6)$$

Moreover, each incoming frame would split into N×N blocks, and each block state would be examined using the Gaussian activation function. The sum of the Gaussian activation functions within each N×N block from each neuron of the summation layer is as follows:

$$\varphi = \sum_{p_t \in \mu} S_{max} \quad (7)$$

Where $p_t$ is each pixel value of the corresponding block $\mu$, and the block size N could be set to 4 empirically. To determine whether the block $A_s(i; j)$ has a high probability of containing the background information, the calculated sum of the block must exceed a threshold value $\tau$, and subsequently be labeled as '0'. Otherwise, the block $A_s(i; j)$ will be labeled as '1' to indicate a high probability that the block contains moving vehicles. This decision rule can be expressed as follows:

$$A_s(i, j) = \begin{cases} 0, & \text{if } \varphi \ge \tau \\ 1, & \text{otherwise} \end{cases} \quad (8)$$

After the third sub-module 506 which performs the block estimation procedure to eliminate blocks that are determined to have a high probability of containing background information, the fourth sub-module 507 would perform the vehicle detection procedure to detect moving vehicles within only those blocks that are regarded as having high probability of containing moving vehicles.

The detection result would strongly depend on the output layer of the PNN, which generates the binary motion detection mask. This is accomplished via the winner-takes-all rule as follows:

$$Y = \max_{m=1\sim E} \sum_{i=1}^{H} Z_i^m \quad (9)$$

Where $Z_m^i$ is the output value of the i-th pattern-layer neuron in the m-th summation layer, and H is the number of pattern layer neurons in the m-th summation layer. The binary mask of moving vehicles can be evaluated using the decision rule as follows:

$$F(x, y) = \begin{cases} 1, & \text{if } Y(x, y) < \omega \\ 0, & \text{otherwise} \end{cases} \quad (10)$$

where $\omega$ represents the experiential threshold value and F(x, y) is labeled either as '1' to represent a motion pixel that is part of a moving vehicle or as '0' to represent a background pixel.

After all the operations are completed for the current incoming frame, the fifth sub-module would use an equation to update the neurons of the pattern layer in the proposed background updating procedure for the next incoming frame as follows:

$$W(x,y)'_i = (1-\alpha)W(x,y)_i + \alpha p_t(x,y) \quad (11)$$

where $W(x; y)'_i$ and $W(x; y)_i$ would represent the updated and the original i-th neurons at position (x, y), respectively, and $\alpha$ is the empirical parameter.

Figure 7:
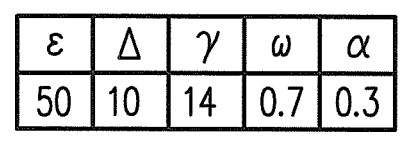

FIG. 7 is a table which illustrates specific parameter values of PNNMD in accordance with one of the exemplary embodiments of the present disclosure. It should be noted that the values of FIG. 7 were considered optimal at the time of the publication of the above mentioned essay incorporated by reference, these values would be associated with a range or tolerance which is presented in the essay. Also the essay contains experimental results and discusses the merits and achievement of the proposed method in greater detail.

In view of the aforementioned descriptions, the present disclosure is able to accurately discern a moving object from a background object in a pixel-by-pixel determination basis within an environment of a bandwidth limiting network.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The invention claimed is:

1. A moving object detection method based on a Probabilistic Neural Network (PNN) model to distinguish a moving object pixel from a background object pixel in a video image delivered over a bandwidth limited network, and the method comprising:

receiving a sequence of images of a fixed location;

generating from the sequence of images a background model based on the PNN model having four layers comprising an input units layer, a pattern units layer, a summation units layer, and an output units layer;

defining the nodes of the four layers of the PNN model, the weight coefficient for each of the nodes, and the relationships among the nodes, wherein defining the nodes of the pattern units layer comprises:

receiving pixel intensity $p_t(x, y)$ for each pixel of each t-th frame of the sequence of images, wherein the pixel intensity $p_t(x, y)$ for each pixel has L possible levels;

generating a histogram distribution for each t-th frame of pixel intensity $p_t(x, y)$ of all pixels, and the distribution is represented by $D(p_t(x, y)_k) = \{n_0, n_1, \ldots, n_k, \ldots, n_{L-1}\}$, wherein $n_k$ is the number of pixels whose level is $p_t(x, y)$ for each intensity level from 0 to k, and $D(p_t(x, y)_k)$ is the distribution; and defining i-th node and assigning weight coefficients, $C_t(x, y)_i$, for the i-th node according to $$P_t(x, y)_k \begin{cases} \in C_t(x, y)_i, & \text{if } D(p_t(x, y)_k) \geq \varepsilon \\ \notin C_t(x, y)_i, & \text{if } D(p_t(x, y)_k) < \varepsilon \end{cases}$$

where k=0 to L−1, and $\varepsilon$ is a predetermined threshold;

receiving a current frame of the sequence of images and dividing the current frame into N by N blocks where N is a positive integer greater than 1;

determining pixel blocks by eliminating from the N by N blocks which are statistically determined to contain only background pixels; and determining whether a pixel of the pixel blocks of the sequence of images is a moving object pixel or a background object pixel by comparing the maximum value of all nodes of the output units layer against an output threshold.

2. The method of claim 1, wherein after all pixels of the pixel blocks of the current frame have been evaluated, claim 1 further comprising:

updating nodes of the pattern units layer for the next frame of the current frame according to $W(x,y)'_i = (1-\alpha)W(x, y)_i + \alpha p_t(x, y)$, where $W(x, y)'_i$ is an updated coefficient of i-th node at position (x,y) of the next frame t+1, $W(x, y)_i$ is coefficient of i-th node of the current frame t, $p_t(x, y)$ is pixel intensity of a pixel at the position (x, y) of the current frame t, and $\alpha$ is a predetermined empirical parameter.

3. The method of claim 1 further comprising:

determining whether to add new nodes by comparing the similarity of the coefficients between two nodes $C_t(x, y)_i$ and $C_t(x, y)_{i+1}$ according to $$U(x, y)_m \begin{cases} \in C_t(x, y)_i, & \text{if } |C_t(x, y)_i - C_t(x, y)_i + 1| \leq \Delta \\ \notin C_t(x, y)_i, & \text{if } |C_t(x, y)_i - C_t(x, y)_i + 1| > \Delta \end{cases}$$

so that if the similarity between $C_t(x, y)_i$ and $C_t(x, y)_{i+1}$ exceeds the threshold $\Delta$ then a new node $U(x, y)_{m+1}$ between $C_t(x, y)_i$ and $C_t(x, y)_{i+1}$ is generated.

4. The method of claim 3, wherein determining pixel blocks by eliminating from the N by N blocks the blocks which are statistically determined to contain only background pixels comprising:

dividing the current frame into N by N blocks;

for a first block of the N by N blocks, estimating a similarity score $Z(p_t, W_i)m$ between the $p_t(x, y)$ and the i-th node $W_i$ in the pattern units layer according to $$Z(p_t, W_i)m = \exp\left(\frac{-\|p_t(x, y) - W_i\|^2}{2\sigma^2}\right),$$

where $\sigma$ is an empirical tolerance, and m=1 to E, where E represents the total number of nodes in the summation units layer;

determining whether the first block contains only background pixels by using the similarity score.

5. The method of claim 4 wherein determining whether the first block contains only background pixels by using the similarity score comprising:

obtaining the similarity score in each category of the summation units layer of the first block of the current frame;

selecting the maximum value from the similarity score in each category of the summation units layer;

summing the similarity score within each of the N by N blocks of each node of the summation units layer; and the first block is determined to contain only background pixels when summing the similarity score generates a value which exceeds an experiential threshold.

6. The method of claim 5, wherein obtaining the similarity score in each category of the summation units layer of the first block of the current frame is according to $S(m) = \sum_{i=1}^{H} Z(p_t, W_i)_m$ where H is the total number of nodes in the pattern units layer of the m-th summation units layer node and selecting the maximum value from the similarity score in each category of the summation units layer is according to $S_{max} = \max_{m=1\sim E} S(m)$.

7. The method of claim 6, wherein summing the similarity score within each of the N by N blocks of each node of the summation units layer is according to $$\varphi = \sum_{p_t \in \mu} S_{max},$$

where $p_t$ is each pixel value of the first block $\mu$; and the first block is determined to contain only background pixels when summing the similarity score generates a value which exceeds an experiential threshold according to $$A_s(i,j) = \begin{cases} 0, & \text{if } \varphi \geq \tau \\ 1, & \text{otherwise} \end{cases}$$

such that when the block $A_s(i,j)$ of the current frame exceeds the experiential threshold $\tau$, the block $A_s(i,j)$ is determined to contain only background pixels.

8. The method of claim 4, wherein determining whether the pixel of the pixel blocks of the sequence of images is the moving object pixel or the background object pixel by comparing the maximum coefficient of the output units layer against the output threshold comprising:
   calculating values of all the nodes of the output units layer and obtaining Y, the maximum value of all the nodes of the output units layer, according to $$Y = \max_{m=1 \sim E} \sum_{i=1}^{H} Z_i^m,$$

where $Z_i^m$ is the value of the i-th pattern units layer node in the m-th summation layer, and H is the total number of pattern layer nodes in the m-th summation layer, and
   the pixel is determined to be a moving object pixel when Y exceeds the output threshold.

9. The method of claim 1, wherein the input units layer receives the $p_t(x, y)$ value in $YC_bC_r$ color space where Y is luminance, $C_b$ is blue-difference chroma, and $C_r$ is red-difference chroma.

10. A moving object detection apparatus comprising a transceiver for transmitting and receiving data and a processor coupled to the transceiver and is configured for:
   receiving from the transceiver a sequence of images of a fixed location;
   generating from the sequence of images a background model based on the PNN model having four layers comprising an input units layer, a pattern units layer, a summation units layer, and an output units layer;
   defining the nodes of the four layers of the PNN model, the weight coefficient for each of the nodes, and the relationships among the nodes, wherein defining the nodes of the pattern units layer comprises:
      receiving pixel intensity $p_t(x,y)$ for each pixel of each t-th frame of the sequence of images, wherein the pixel intensity $p_t(x, y)$ for each pixel has L possible levels;
      generating a histogram distribution for each t-th frame of pixel intensity $p_t(x,y)$ of all pixels, and the distribution is represented by $D(p_t(x,y)_k)=\{n_0, n_1, \ldots, n_k, \ldots, n_{L-1}\}$, wherein $n_k$ is the number of pixels whose level is $p_t(x, y)$ for each intensity level from 0 to k, and $D(p_t(x,y)_k)$ is the distribution; and defining i-th node and assigning weight coefficients, $C_t(x, y)_i$, for the i-th node according to $$P_t(x,y)_k \begin{cases} \in C_t(x, y)_i, & \text{if } D(p_t(x, y)_k) \geq \varepsilon \\ \notin C_t(x, y)_i, & \text{if } D(p_t(x, y)_k) < \varepsilon \end{cases}$$

where $k=0$ to $L-1$, and $\varepsilon$ is a predetermined threshold;
   receiving a current frame of the sequence of images and dividing the current frame into N by N blocks where N is a positive integer greater than 1;
   determining pixel blocks by eliminating from the N by N blocks which are statistically determined to contain only background pixels; and
   determining whether a pixel of the pixel blocks of the sequence of images is a moving object pixel or a background object pixel by comparing the maximum value of all nodes of the output units layer with an output threshold.

11. The apparatus of claim 10, wherein after all pixels of the pixel blocks of the current frame have been evaluated by the processor, the processor of claim 10 is further configured for:
   updating nodes of the pattern units layer for the next frame of the current frame according to $W(x,y)'_i=(1-\alpha)W(x,y)_i+\alpha p_t(x,y)$, where $W(x, y)'_i$ is an updated coefficient of i-th node at position (x,y) of the next frame t+1, $W(x, y)_i$ is coefficient of i-th node of the current frame t, $p_t(x, y)$ is pixel intensity of a pixel at the position (x, y) of the current frame t, and $\alpha$ is a predetermined empirical parameter.

12. The apparatus of claim 10, wherein the processor is further configured for:
   determining whether to add new nodes by comparing the similarity of the coefficients between two nodes $C_t(x, y)_i$ and $C_t(x, y)_{i+1}$ according to $$U(x, y)_m \begin{cases} \in C_t(x, y)_i, & \text{if } |C_t(x, y)_i - C_t(x, y)_i+1| \leq \Delta \\ \notin C_t(x, y)_i, & \text{if } |C_t(x, y)_i - C_t(x, y)_i+1| > \Delta \end{cases}$$

so that if the similarity between $C_t(x, y)_i$ and $C_t(x, y)_{i+1}$ exceeds the threshold $\Delta$ then a new node $U(x, y)_{m+1}$ between $C_t(x, y)_i$ and $C_t(x, y)_{i+1}$ is generated.

13. The apparatus of claim 12, wherein the processor is configured for determining pixel blocks by eliminating from the N by N blocks the blocks which are statistically determined to contain only background pixels comprising:
   dividing the current frame into N by N blocks;
   for a first block of the N by N blocks, estimating a similarity score $Z(p_t, W_i)m$ between the $p_t(x, y)$ and the i-th node $W_i$ in the pattern units layer according to $$Z(p_t, W_i)m = \exp\left(\frac{-\|p_t(x, y) - W_i\|^2}{2\sigma^2}\right),$$

where $\sigma$ is an empirical tolerance, and $m=1$ to E, where E represents the total number of nodes in the summation units layer;
   determining whether the first block contains only background pixels by using the similarity score.

14. The apparatus of claim 13 wherein the processor is configured for determining whether the first block contains only background pixels by using the similarity score comprising:
   obtaining the similarity score in each category of the summation units layer of the first block of the current frame;
   selecting the maximum value from the similarity score in each category of the summation units layer;

summing the similarity score within each of the N by N blocks of each node of the summation units layer; and the first block is determined to contain only background pixels when summing the similarity score generates a value which exceeds an experiential threshold.

15. The apparatus of claim 14, wherein the processor is configured for obtaining the similarity score in each category of the summation units layer of the first block of the current frame is according to $S(m)=\Sigma_{i-1}^{H}Z(p_t, W_i)_m$ where H is the total number of nodes in the pattern units layer of the m-th summation units layer node, and the processor is configured for selecting the maximum value from the similarity score in each category of the summation units layer is according to $S_{max}=\max_{m=1-E}S(m)$.

16. The apparatus of claim 15, wherein the processor is configured for summing the similarity score within each of the N by N blocks of each node of the summation units layer is according to $$\varphi = \sum_{p_t \in \mu} S_{max},$$

where $p_t$ is each pixel value of the first block μ; and the first block is determined by processor to contain only background pixels when summing the similarity score generates a value which exceeds an experiential threshold according to $$A_s(i, j) = \begin{cases} 0, & \text{if } \varphi \geq \tau \\ 1, & \text{otherwise} \end{cases}$$

such that when the block $A_s(i, j)$ of the current frame exceeds the experiential threshold τ, the block $A_s(i, j)$ is determined to contain only background pixels.

17. The apparatus of claim 13, wherein the processor is configured for determining whether a pixel of the pixel blocks of the sequence of images is a moving object pixel or a background object pixel by comparing the maximum coefficient of the output units layer with an output threshold comprising:

calculating values of all the nodes of the output units layer and obtaining Y, the maximum value of all the nodes of the output units layer, according to $$Y = \max_{m=1 \sim E} \sum_{i=1}^{H} Z_i^m,$$

where $Z_i^m$ is the value of the i-th pattern units layer node in the m-th summation layer, and H is the total number of pattern layer nodes in the m-th summation layer, and the pixel is determined to be a moving object pixel when Y exceeds an experiential threshold value.

18. The apparatus of claim 10, wherein the processor is configured for:

the input units layer receiving through the transceiver the $p_t$ (x, y) value in $YC_bC_r$ color space where Y is luminance, $C_b$ is blue-difference chroma, and $C_r$ is red-difference chroma.

* * * * *